United States Patent [19]

Doyle

[11] Patent Number: 5,017,155
[45] Date of Patent: May 21, 1991

[54] TERMINAL BOARDS AND FRAME THEREFOR

[75] Inventor: Clarence E. Doyle, Chester, N.J.

[73] Assignee: AT&T Bell Laboratories, Murray Hill, N.J.

[21] Appl. No.: 452,524

[22] Filed: Dec. 18, 1989

[51] Int. Cl.$^5$ .............................................. H01R 9/24
[52] U.S. Cl. .................................................. 439/532
[58] Field of Search ............... 439/532, 709, 712–719; 361/426–429; 379/325–328

[56] References Cited

U.S. PATENT DOCUMENTS

| | | | |
|---|---|---|---|
| 1,819,657 | 8/1931 | Smith | 361/426 |
| 2,724,814 | 11/1955 | Stubbers | 439/717 |
| 3,506,947 | 4/1970 | Leskosek | 439/532 |
| 4,390,230 | 6/1983 | Knickerbocker | 439/532 |
| 4,712,232 | 12/1987 | Rodgers | 174/60 |
| 4,913,659 | 4/1990 | Doyle | 439/395 |

Primary Examiner—Neil Abrams
Attorney, Agent, or Firm—R. F. Kip, Jr.

[57] ABSTRACT

A terminal board panel comprises a longitudinally elongated frame enclosing a rectangular space, and a plurality of terminal boards disposed end-to-end in a longitudinal column in such space. Each board on its laterally opposite sides has outwardly projecting flanges cooperating with inwardly projecting flanges on two rails on laterally opposite sides of (and forming parts of) the frame to lock the board to the frame by tongue-and-groove couplings. Ones of the flanges on the boards and on the rails comprise an alternation of projecting tabs and of gaps between such tabs to permit the "tongue" of the associated coupling to be inserted in the "groove" thereof by a transverse relative vertical movement of board and frame by which the tabs of one of such flanges passes through the gaps in the other. The "tongue" is then locked into the "groove" by a longitudinal horizontal sliding of the board relative to the frame until the tabs of the "tongue" flange are flanked on either side by solid portions of the other flanges constituting the coupling. The boards also have interfitting flanges thereon for locking the boards together by tongue-and-groove couplings when assembled between the rails. Each board supports an array of wire connection posts and has wire fanning strips along two sides.

6 Claims, 6 Drawing Sheets

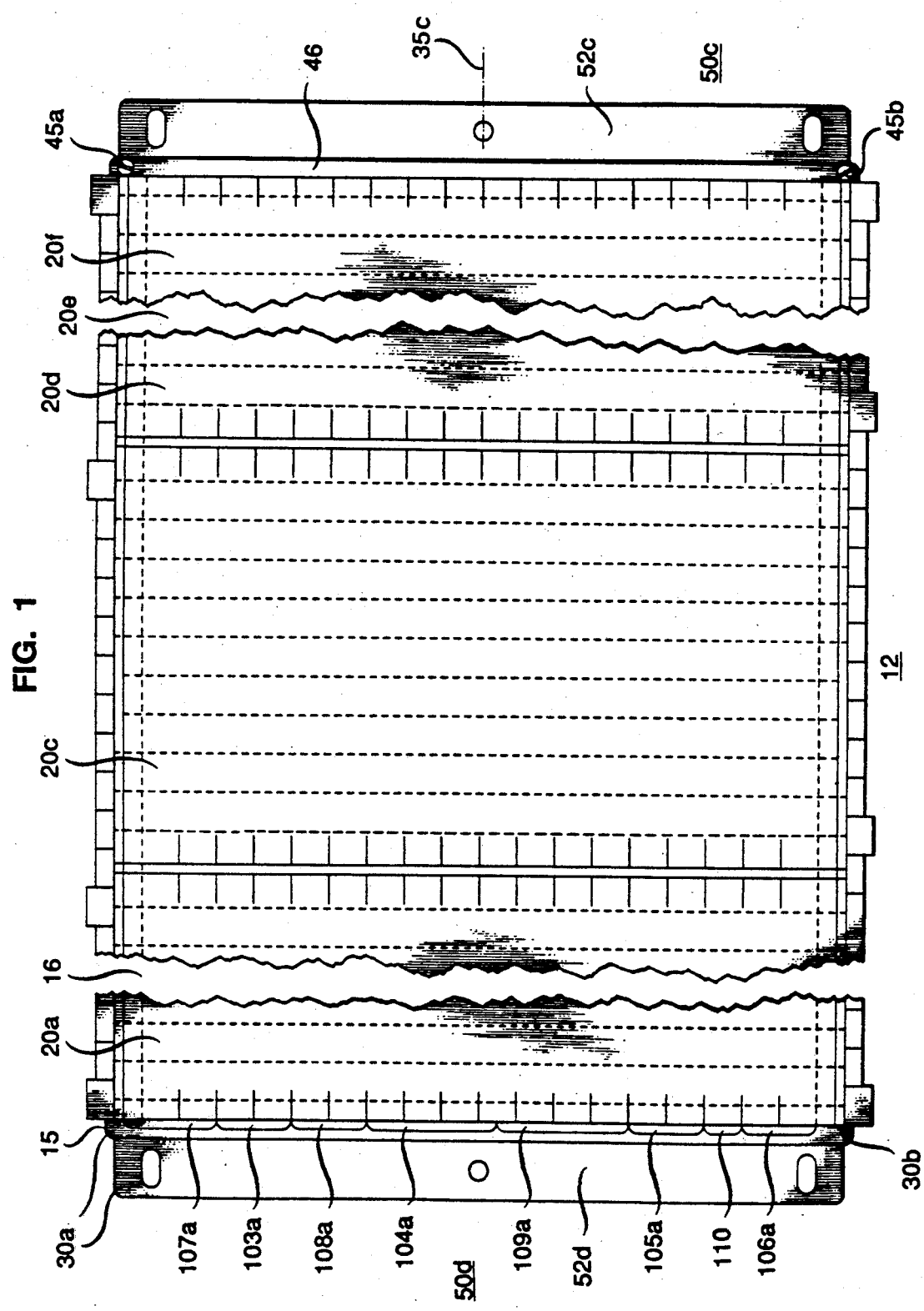

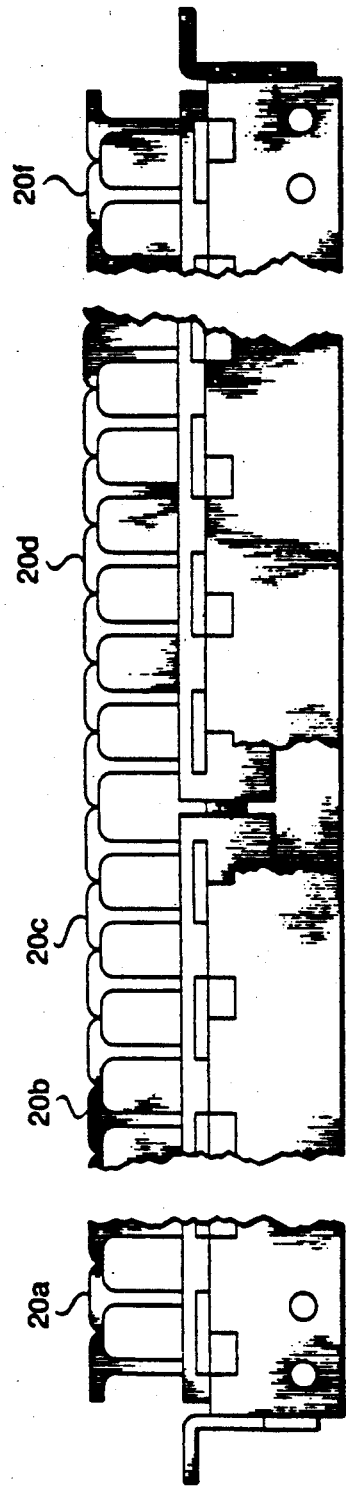
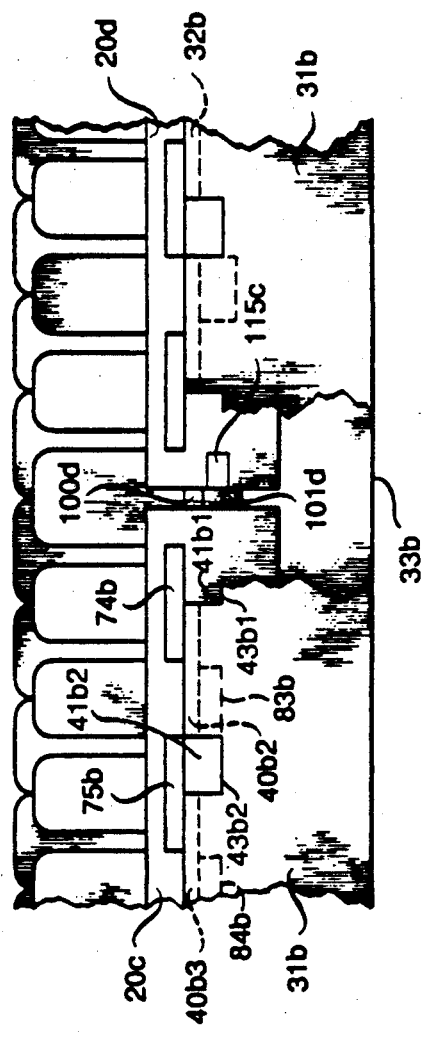

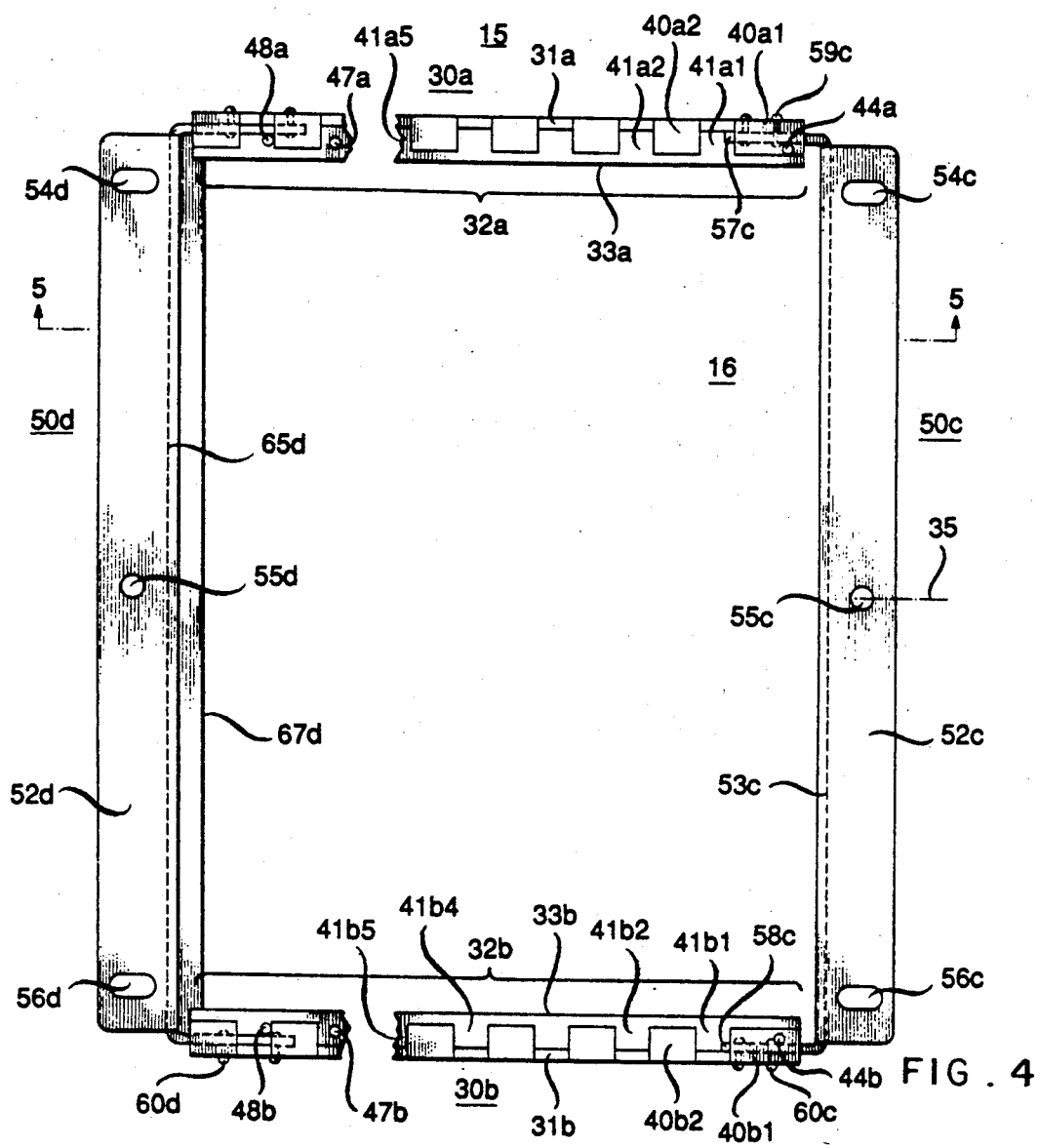
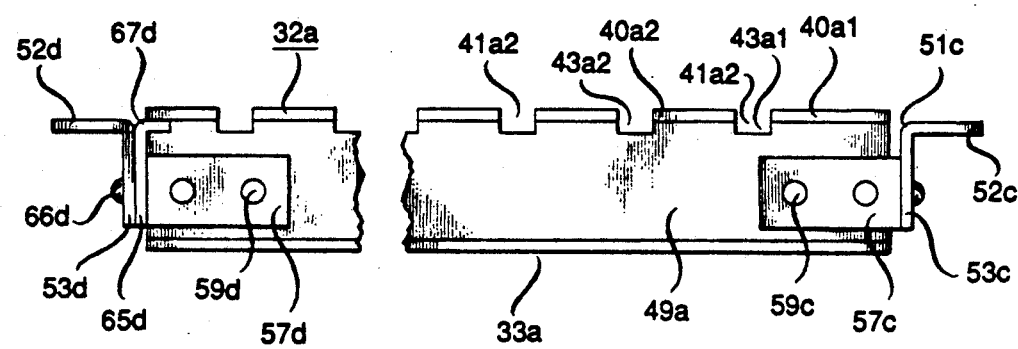
FIG. 5

TERMINAL BOARDS AND FRAME THEREFOR

This invention relates generally to apparatus adapted to provide electrical interconnections, via terminals and jumper leads, between separate sets of electrical conductors. More particularly, this invention relates to apparatus of such kind in the form of a terminal board panel comprising frame means and a plurality of terminal board means enclosed and supported by such frame means. The invention also relates to individual components of such a terminal board panel.

BACKGROUND OF THE INVENTION

In a feeder-distribution interface unit, pairs of telephone lines from individual telephone stations and pairs of wires from a central station (with each wire pair having an assigned telephone number) are terminated at, respectively, feeder terminal boards and distribution terminal boards within the unit. Jumper leads run between the two types of terminal boards to connect the telephone lines for each telephone station to a selected pair of wires from the central station to thereby give a particular telephone number to that telephone station.

Within such unit, the various terminal boards therein are mounted in panels. Each panel comprises (a) a rectangular frame comprising two long side rails joined at their ends by two end "rungs" and (b) six terminal boards mounted in the space between the side rails. Up to now, the means for mounting the terminal boards has been to provide five additional partitioning rungs disposed between the side rails, and dividing such space into six sub-spaces for the six boards, and to fasten each board by three screws on each of two opposite sides thereof to two of such rungs. The use, however, of such additional rungs is disadvantageous in the respect that the rungs themselves are expensive, and further costs are incurred in securing the ends of such rungs to the two side rails. Moreover, the described technique of screw-fastening the terminal boards to the rungs requires thirty-six (36) screws and is disadvantageous because of the cost of (and the time and effort taken to install) that inordinately large number of screws. If the screws are self tapping and inserted into holes in boards of plastic material, the tapping action of the screws creates around such holes a hoop stress likely to produce splitting and cracking of the plastic material.

SUMMARY OF THE INVENTION

These and other disadvantages of conventional terminal board panel equipment are obviated according to the invention in one of its aspects by providing a terminal board panel comprising a pair of longitudinal rail means opposite each other on laterally opposite sides of a space between them, a plurality of terminal boards disposed in a longitudinal column thereof between such two rail means, and each board being adjacent on each of its laterally opposite sides to a respective one of such two rail means, and a plurality of coupling means disposed in the length of such rail means in the regions of adjacency of such two rail means and such plurality of boards to couple each of such boards by a tongue-and-groove coupling to each of such two rail means. In such terminal board panel, the mentioned partitioning rungs are absent to thereby eliminate the costs of furnishing them and of screwing them to the two side rails. Also, since the terminal boards are secured in the panel by tongue-and-groove couplings rather than screws, the costs of furnishing the previously used 36 screws and of installing them are likewise dispensed with.

According to the invention in another of its aspects, the terminal boards in the panel are provided with features by which such a board may be coupled on its longitudinally opposite sides to an adjacent board or other support means to permit distribution to the element coupled thereto of part of a load imposed on the first named board.

BRIEF DESCRIPTION OF THE DRAWING

For a better understanding of these and other aspects of the invention, reference is made to the accompanying description of an exemplary embodiment thereof, and to the accompanying drawings wherein:

FIG. 1 is a plan view of a horizontally disposed terminal board panel according to the invention, parts of such panel being shown broken away in FIG. 1;

FIG. 2 is a view in front elevation of the FIG. 1 panel with parts thereof being broken away;

FIG. 3 is an enlarged front elevation view of part of the FIG. 1 panel which appears in FIG. 2;

FIG. 4 is a plan view of a frame which is one of the components of the FIG. 1 panel, the drawing of FIG. 4 being to a different scale than FIG. 1, and part of such frame being shown broken away in FIG. 4;

FIG. 5 is a front elevational view of the FIG. 4 frame with part thereof being broken away;

Figure 6:
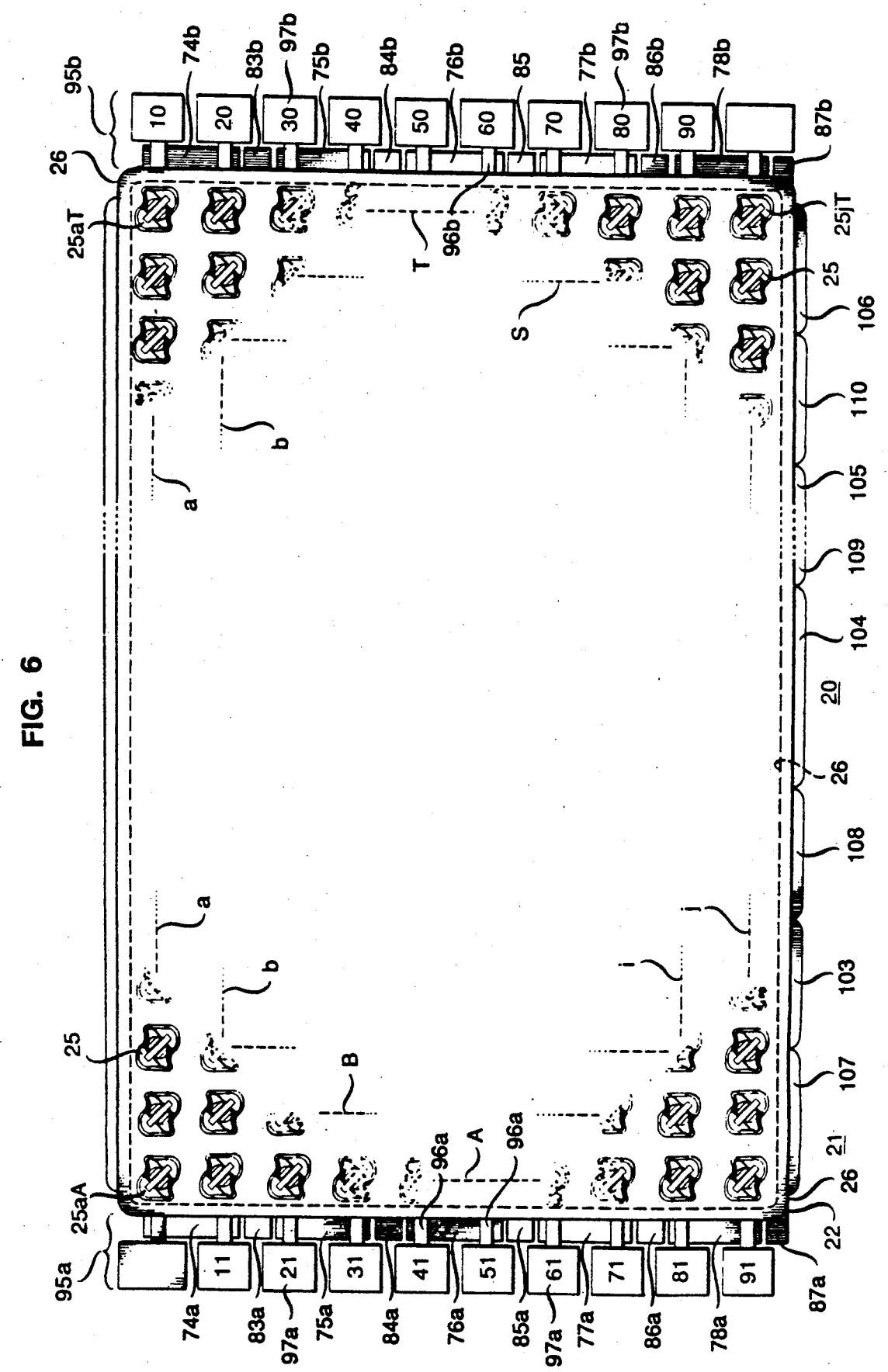
FIG. 6 is a plan view of a terminal board which is another of the components of the FIG. 1 panel; and the view of such terminal board provided by FIG. 6 being enlarged and rotated 90° clockwise in relation to the view provided by FIG. 1 of the same terminal board.

The terminal board panel to be described herein is, as stated, shown horizontally disposed in FIG. 1. In use, however, such panel would normally be vertically disposed, with what constitutes the right hand end of the panel in FIG. 1 becoming, in such vertical disposition, the top end of the panel.

In the description which follows, separate elements designated by the same reference numeral but by different suffixes for such numeral are counterparts of each other, and a description of any one such element shall be taken, unless the context otherwise requires, as being equally applicable to its counterpart element or elements.

DETAILED DESCRIPTION

Referring now to FIG. 1, the reference numeral 12 generally designates a terminal board panel comprising a frame 15 enclosing a rectangular space 16 within which are fitted end to end (in a longitudinal column) a plurality of terminal boards. Those boards are collectively designated by the reference numeral 20 and individually designated in FIG. 1 as 20a, 20b, 20c, 20d, 20f, one such board 20e being not shown in that figure. As indicated by the terminal board designations just given, frame 16 is ordinarily designed to accommodate six terminal boards 20 but may be designed to accommodate a greater or lesser number. All of the terminal boards are essentially duplicates of each other. When a particular board being described is hereafter referred to as board 20, the board which is meant is the board 20c in FIG. 1 unless the context indicates otherwise.

Turning now to FIG. 6, the terminal board 20 shown therein (i.e., board 20c of FIG. 1) is the same as the terminal board disclosed in U.S. Pat. No. 4,913,659 issued Apr. 3, 1990 in the name of Clarence E. Doyle for "Push Cap Terminals and Terminal Boards with Same", and assigned to the assignee hereof ("Doyle, Case 1"), such patent being incorporated herein by reference and made a part hereof.

The major part of board 20 is (FIG. 6) a molded synthetic resinous piece 21 comprising a base 22 in the form of a horizontal rectangular base plate and a plurality of posts 25 upstanding from base 22 and integral therewith and a circumferential flange 26 downstanding from the perimeter of base plate 22. The posts 25 are adapted to be fitted with caps, with each post and cap constituting a housing means. As shown in FIG. 6, the posts 25 are arranged on base 22 in rows and columns of which the centerlines for the rows are designated a,b, . . . i,j, and the centerlines of the columns are designated A,B, . . . S,T. All of the posts 25 are duplicates of each other. The location of any particular post on base 22 can be indicated by an appropriate designatory suffix. Thus, for example, the post located at the intersection of row a and column T can be designated as the post 25aT.

The mentioned caps for the posts 25 are disclosed in Doyle, Case 1. Each post 25 contains a vertical metallic terminal strip having at its bottom a stem passing vertically through base 22 to project downwards from it. The strip has at its top a pair of upwardly extending tangs horizontally separated by an open-topped notch bordered by cutting edges on the tangs. Such post 25, the cap thereon and the terminal strip in the post provide together a terminal for electrically interconnecting a wire and an insulated wire lead as follows.

The wire is connected beneath base 22 to the stem of the terminal strip by being wrapped around it by a wire wrapping tool. To connect the lead, a front end portion thereof is fed through an entry hole in the cap to pass into the interior of the cap when in raised position on post 25. The cap is then forced down on the post to drive the front portion of the lead down into the intertang notch. Thereupon, the insulation of the lead is pierced by the mentioned cutting edges such that the two tangs electromechanically contact the metallic core of the lead. The effect of such contact is that the wire and the lead become electrically coupled together by the terminal. Further details are given in Doyle, Case 1.

Returning to FIG. 1 (and considering also FIGS. 2, 4, and 5), the frame 15 for the panel 12 comprises (FIG. 4) rear and front longitudinally extending rails 30a, 30b disposed opposite each other on laterally opposite sides of the space 16 enclosed by the frame. Rail 30a is a channel member of rectangular "U" cross-section in which the "U" lies on its side such that the bottom of the "U" is vertical. That "U" configuration is imparted to rail 30a by virtue of such rail comprising a central vertical web 31a, corresponding to the bottom of the "U", and upper and lower horizontal webs 32a, 33a separated from each other and corresponding to the two arms of the "U".

The three webs longitudinally extend for the full length of rail 30a. Horizontal webs 32a, 33a are fixedly joined along the laterally rear margin of frame 15 to the vertical central web 31a such that the latter web is on the outside of the frame, and the two horizontal webs project from such central web laterally inwards towards the longitudinal centerline 35 of space 16. Because the webs 32a, 33a so project, they provide for the rail 30a a pair of inner flanges disposed on the inside of rail 30a and extending over its length inwards towards the other rail 30b.

Of the two inner webs or flanges 32a, 33a, the lower web 33a is of constant lateral width in its extent in the length of rail 30a. The upper inner flange 32a includes, however, in its longitudinal extent (and, in fact, is constituted of) an alternation of square tabs and square gaps so that the lateral width of flange 32a varies with displacement in the longitudinal direction. Such tabs are collectively designated as tabs 40a and are distinguished from each other by individually designating them by the reference numerals 40a1, 40a2, etc. The mentioned gaps are similarly collectively designated as gaps 41a while being distinguished from each other by being individually designated by the reference numerals 41a1, 41a2, etc. The purpose of incorporating such alternation of tabs and gaps in flange 32a will later become clear.

The horizontal gaps 41a at their rear margins (FIG. 4) have slight downward vertical extensions so as to form shallow vertical notches 43a in the vertical web of the rail 30a. Two of such notches 43a1, 43a2 are shown in FIG. 5.

The right hand tab 40a1 of rail 30a has formed thereon a hole 44a for reception therein of a self-tapping screw 45a (FIG. 1) passed through an unthreaded hole in one end of a keeper bar 46 extending laterally across frame 15 at its right hand end.

The two web flanges 32a, 33a of rail 30a bound vertically opposite sides of a channel 49a on the inner side of the central web 31a of rail 30 and extending longitudinally in the rail for its length.

The rail 30b is similar in structure to rail 30a. Rail 30b is, however, rotated 180° about its longitudinal axis in relation to the angular position of rail 30a about the longitudinal axis thereof. As a result, there is axial symmetry between the elements of rail 30a and those of rail 30b in relation to the overall longitudinal axis 35 of the frame 15.

Disposed at the right end of the space 16 in frame 15 is a tie member 50c extending between the rails 30a, 30b. The member 50c is fabricated from sheet metal which has been bent into a right dihedral angle (FIG. 5) about a bend line 51c such that member 50c comprises laterally elongated horizontal and vertical strip portions 52c, 53c which are on opposite sides of such bend line 51c, and which, respectively, project horizontally outwardly and downwardly therefrom.

Horizontal strip 52c constitutes what is known as an end sheet, and that end sheet has therein three laterally spaced apertures 54c, 55c, 56c. Strip 53c is a bar strip having at its laterally opposite ends, as extensions thereof, a pair of flaps 57c, 58c bent in the horizontal plane at right angles to the bar strip to project longitudinally inwards thereof. Flaps 57c, 58c abut the inner sides of the vertical webs 31a, 31b, respectively, of the rails 30a, 30b. These flaps 57c, 58c are secured to, respectively, the webs 31a, 31 by rivets 59c, 60c passing through holes in the flaps and the webs.

At its left hand end, the frame 15 has a tie member 50d laterally extending between the rails 30a, 30b. The member 50d is similar in structure to the right-hand tie member 50c with the exception that the vertical bar strip 53d (FIG. 5) of the left hand means is reinforced by a laterally elongated vertical plate 65d disposed flush against the inner face of strip 53d and secured to that strip by rivets 66d passing through holes in both the strip and the plate. The top of reinforcing plate 65d is shaped to provide a lip 67d curving in the upward direction away from the top of the bar strip 53d so as to project inwards towards the center of the space 16 in the frame. As will be evident from FIGS. 4 and 5, the tie member 50d is rotated 180° around its lateral axis in relation to the angular position of the member 50c. As a result, the counterpart elements of the members 50c, 50d are axially symmetrical about the laterally extending centerline of the frame 15.

The tie means 50c, 50d are made very rigid structures by the right angle bends therein which render such tie means in the form of "L" channel members. That rigidity of the means 50c, 50d together with their riveted fastening to the rails 30a, 30b causes these tie means to act for such rails as sturdy braces serving to cause the frame 15 constituted of the rails 30 and tie members 50 to have good resistance to deformation from its desired rectangular alignment.

The parts described above for frame 15 are all made of steel. All of these parts except for self-tapping screws 45 (FIG. 1) have an enamel coating thereon.

Figure 7:
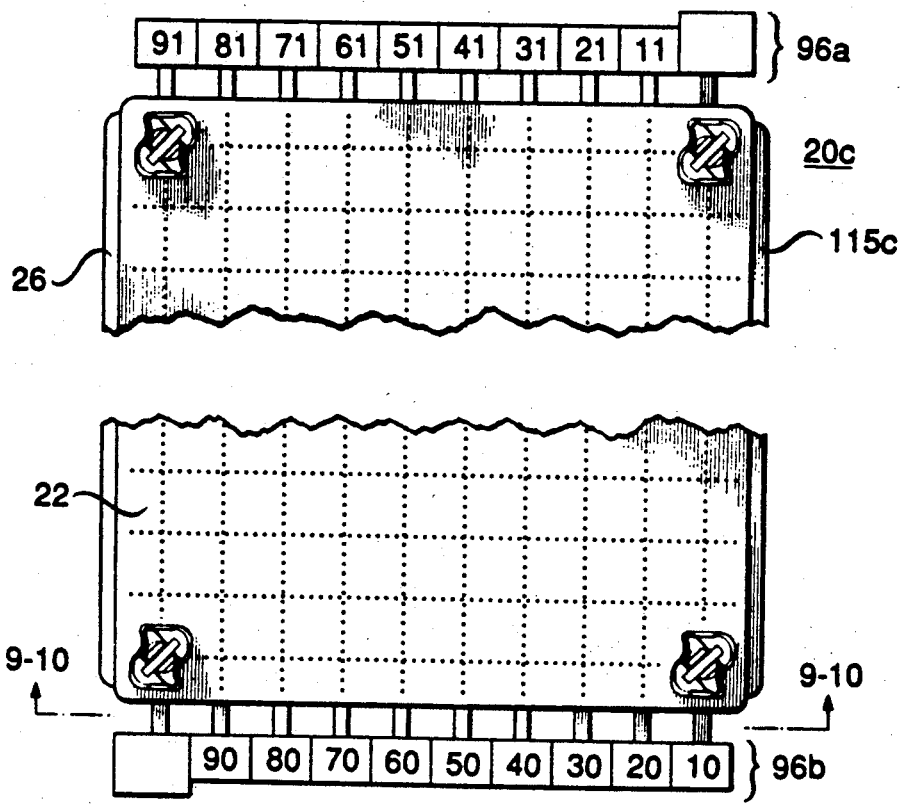
FIG. 7 is an unrotated plan view of a terminal board shown in FIG. 1 and depicted enlarged and rotated 90° clockwise in FIG. 6.
Figure 8:
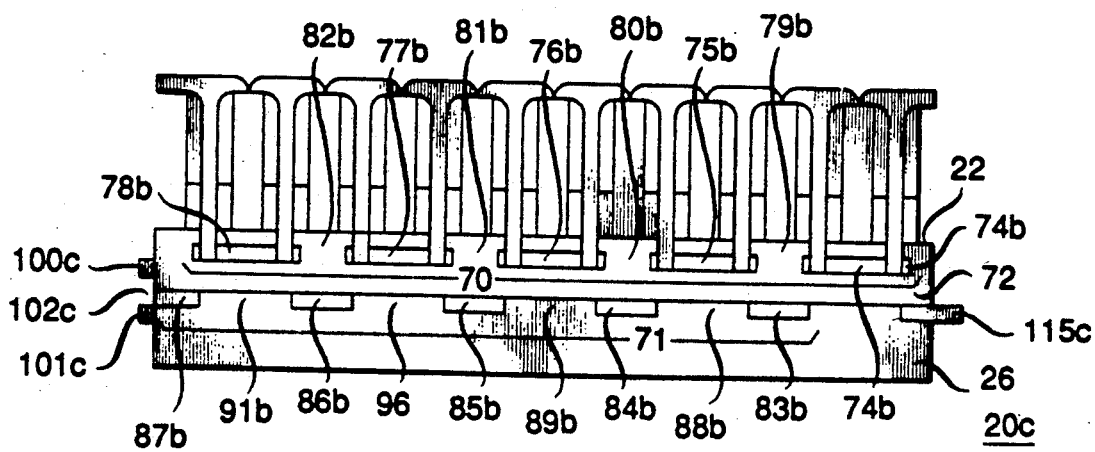
FIG. 8 is a front elevation view of the FIG. 7 terminal board.

Consideration will now be given to further details of the earlier described terminal board 20. Referring to FIGS. 6, 7 and 8, projecting outward from the circumferential flange 26 of the base 22 of board 20, on the front lateral side of that board, are upper and lower flanges 70,71 vertically separated by the transverse width of a channel or "groove" 72 longitudinally extending horizontally between those two flanges. Upper flange 70 is provided by an alternation of square plastic tabs 74b-78b integral with and projecting outward from base flange 26, and of square gaps 79b-82b between these tabs. Similarly lower flange 71 is provided by an alternation of square plastic tabs 83b-87b integral with and projecting outward from base flange 26, and of square gaps 88b-91b between these last named tabs. Each of upper and lower flanges 70,71 thus comprises a row of tabs projecting laterally outward of base 26 and longitudinally spaced apart in a horizontal line. As later discussed in more detail, the horizontal channel 72 between these flanges provides the groove of a tongue-and-groove-coupling for coupling board 20 to one lateral side of frame 15.

It will be noted, in connection with flanges 70,71, that their respective tabs 74b-78b and 83b-87b are staggered in their positions or "phase" in the longitudinal direction in the sense that the tabs 83b-86b of lower flange 71 register vertically with the gaps 79b-82b of upper flange 70 and, conversely, the tabs 75b-78b of the upper flange register vertically with the gaps 88b-91b of the lower flange.

The upper and lower flanges 70 and 71 on the front lateral side of board 20 are duplicated by corresponding upper and lower flanges on the rear lateral side of the board. On that rear lateral side, the upper flange is provided by an alternation (FIG. 6) of square plastic tabs 74a-78a, integral with and projecting outward from base flange 26, and of square gaps in between the tabs 74a-78a. The lower flange is provided by square plastic tabs 83a-87a, likewise integral with and projecting from such base flange, and of square gaps in between the tabs 83a-87a.

The elements just described on the rear lateral side of terminal board 20 are each positioned directly opposite their already-described respective counterpart elements on the front lateral side of that board. From this it follows that the upper flange comprising the row of tabs 74a-78a and the lower flange comprising the row of tabs 83a-87a are vertically spaced flanges and define between them a groove for a tongue-and-groove coupling.

The tabs 74a-78a and the tabs 74b-78b serve as platforms for two fanning strips 95a-95b which are on laterally opposite sides of board 20, and which, in the prior art are separate from but fastened to the terminal board, but which, here are integral with the board. Strip 95a comprises a set of plastic struts 96a upstanding from the tabs 74a-78a and a linear array of rectangular plastic buttons 97a integral with and respectively mounted by such struts to be disposed at the same height in a horizontal line well above the upper surface of the base 22 of board 20. As best shown in FIG. 6, there are ten such struts and they are supported in pairs by the five tabs 74a-78a. The buttons 97a have numbers engraved on their upper surfaces for identifying on board 20 in the rows (FIG. 6) adjacent to these buttons the pairs of terminals in each such row, each such terminal pair having a specific number and being made of a terminal for a tip conductor and a terminal for a ring conductor.

Fanning strip comprises plastic struts 96b and plastic buttons 97b and is similar in character to fanning strip 96a.

The several terminal boards 20 have outwardly projecting flanges not only on their lateral sides but on their longitudinal sides. Specifically, on its left longitudinal side (FIG. 8), the board 20c is equipped with upper and lower stub flanges 100c, 101c salient from the circumferential flange 26 of base 22 and vertically spaced from each other to define a groove 102c lying between the flanges. Upper flange 100c comprises a horizontal, laterally extending row of spaced plastic tabs 103-106 (FIG. 6) integral with base 22 and projecting longitudinally out from its side flange 26. Moreover, flange 101c comprises a similar horizontal, laterally extending row of spaced plastic tabs 107-110 integral with the base and projecting out from side flange 26. The tabs 103-106 and the tabs 107-110 are in staggered phase relation with each other in the lateral direction of extension of the flanges which they respectively form.

On the right side (FIG. 8) of terminal board 20c, the board is equipped with a single plastic stub flange 115c integral with and salient from the vertical side wall 26 of the board's base 22. Flange 115c is in the shape of a horizontal web projecting longitudinally out from that wall and extending horizontally along it between the laterally opposite sides of the board.

The described terminal board panel 12 is assembled and used in the following manner.

To begin with, the frame 15 of the panel and the six terminal boards 20 thereof to be fitted in the frame are separate from each other. Moreover, the keeper bar 46 and its fastening screws 45a, 45b are detached from the frame 15. For convenience of description, the frame 15 will be assumed as being horizontal and as resting on a table or other support (not shown).

The various terminal boards 20 are coupled to the frame 15 one by one in order, starting with board 20a (FIG. 1) and ending with board 20f. The coupling of board 20c to the frame is exemplary of the other board-frame couplings. Such coupling is accomplished as follows.

Figure 9:
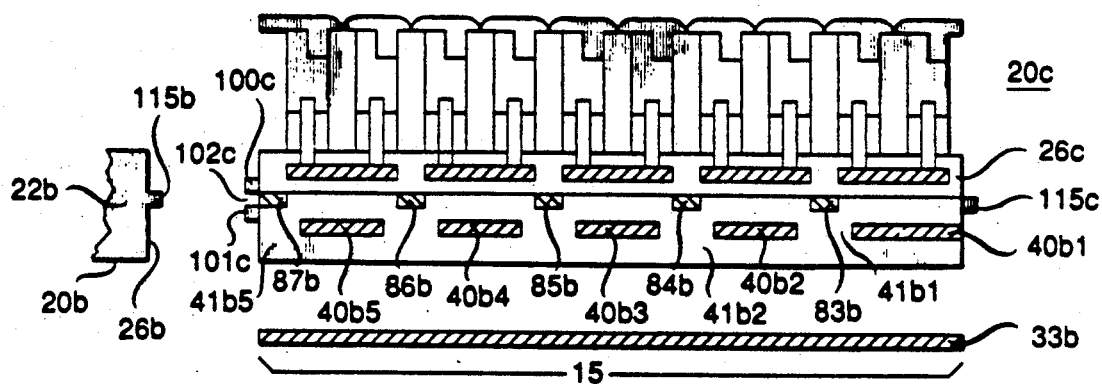
FIG. 9 is a cross-sectional view, taken as indicated by the arrows 9-10, 9-10 in FIG. 7, of the FIG. 7 terminal board and of adjacent parts of the frame of the FIG. 1 panel when such board is positioned transversely above such frame as a first step in coupling such board with such frame.

Referring to FIG. 9, as a first step in effecting the coupling of board 20c, the board is positioned to have a horizontal disposition above frame 15 such that the lower flanges on the laterally opposite sides of the board and comprising tabs 83a–87a and tabs 83b–87b (FIG. 6) are, vertically speaking, just slightly above, respectively, the upper flanges 32a, 32b on the rails 30a, 30b.

As a next step the board 20c is shifted (if necessary) longitudinally relative to the rails 30a, 30b of the frame to bring the board to a first phase position relative to these rails at which the five tabs 83a–87a and the five tabs 83b–87b vertically register with five gaps in, respectively, the rear and front rail upper flanges 32a, 32b which will permit such tabs to pass downward through these gaps. One condition for such downward passage is that not other terminal board already be in place in frame 15 under any of such gaps. Another condition for such passage is that the five gaps in the rail upper flanges with which the mentioned tabs on board 20 are chosen to register are the five gaps included between two of the intermittently occuring tabs on the upper rail flanges which are slightly greater in size than the others, and of which an example is provided by the five gaps immediately to the left of the tab 40b1 (FIG. 4).

Assuming, however, that boards 20a, 20b have already been fitted in place in frame 15, there will still be three sets of five gaps along each of the rail flanges 32a, 32b which will meet both of the above specified conditions and thereby permit downward passage of the tabs 83a–87a and 83b–87b through the upper rail flanges. For the purposes hereof, however, it will be presumed that the gaps which have been chosen to permit such downward passage, and with which the tabs 83a–87a and 83b–97b are brought into vertical registration are the five gaps immediately to the left of tab 40a1 (FIG. 4) and the five gaps 41b1–41b5 (FIG. 9).

Figure 10:
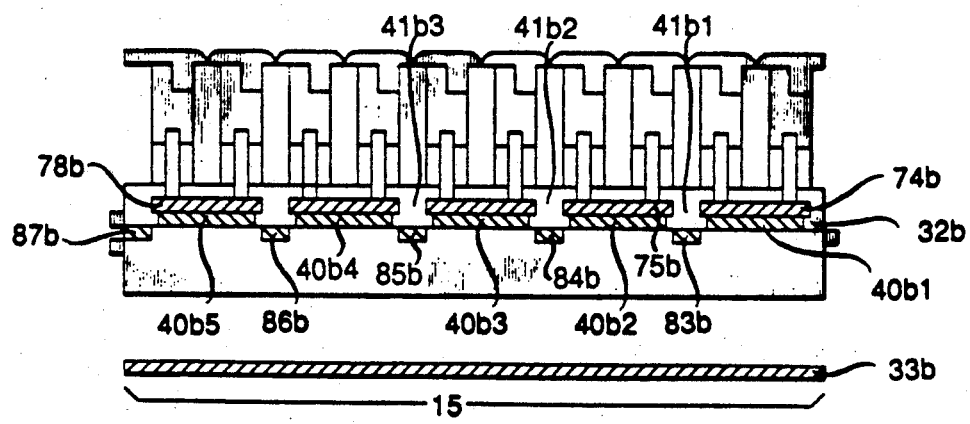
FIG. 10 is a cross-sectional view, also taken as indicated by the arrows 9-10, 9-10 in FIG. 7, of the FIG. 7 board and of adjacent parts of the frame of the FIG. 1 panel when such board is transversely positioned to abut such frame as a second step in coupling such board with such frame.

Having produced registration as described of the tabs and gaps just mentioned, the next step is then taken is displacing the terminal board 20c downward towards the rails 30a, 30b of the frame to cause the following events (FIG. 10) to occur. First, the tabs 83a–87a and 83b–87b of the lower longitudinally extending flanges on the board pass down through, respectively, the gaps 41a1–41a5 and the gaps 41b1–41b5 in the upper rail flanges 32a, 32b. Second, at the end of such passage, the tabs 74a–78a and 74b–78b (FIGS. 6 and 8) of the upper longitudinally extending flanges 70 in the board make contact (FIG. 10) with the upper faces of ones of the tabs 40a, 40b (as, say, the tabs 40b1–40b5) constituting the upper flanges 32 on the rails 30. FIG. 10 shows positions of board 20c and frame 15 upon the completion of both such events.

When the board 20c and the frame 15 are in the relative positions depicted in FIG. 10, the board can be readily removed from the frame by merely lifting the board straight up and away from the frame. In order to prevent such separation, the board 20c is displaced leftward relative to the rails 30 to bring the board to a second longitudinal phase position of the board relative to these rails. Such a position is shown in FIG. 3, and it is one at which all (or at least ones) of the tabs 40a and tabs 40b (as, say, tabs 40b2 and 40b3) of the upper rail flanges 30a, 30b are flanked on their upper sides by tabs (as, say, tabs 74b and 75b) of the upper longitudinal flanges 70 on the laterally opposite sides of board 20c and, on their lower sides, by tabs (as, say, tabs 83b and 84b) of the lower longitudinal flanges 71 on the laterally opposite sides of that board. Because of such flanking on both sides of the tabs of the upper rail flanges of the frame by the tabs of the upper and lower longitudinally extending flanges on the laterally opposite sides of the board 20c, that board now cannot be separated by movement thereof in either transverse (i.e., vertical) direction away from frame 15. Hence, the board is now mechanically coupled with the frame.

As will be evident, the coupling between the frame and each lateral side of the board is a tongue-and-groove coupling in which, on each such lateral side, the channel 72 between the board's upper and lower longitudinal flanges 70 and 71 provides the "groove", and the upper rail flange 30 on that side of the board provides the "tongue" which is received in such "groove". As is characteristic of such a tongue-and-groove coupling the elements coupled thereby, namely, board 20c and frame 15, cannot move transversely relative to each other (except for play, if any, provided by the coupling) but can be shifted indefinitely in the longitudinal direction relative to each other. While any one such coupling does not prevent lateral relative movement of the two coupled elements, and their consequent separation, the fact that board 20c is coupled on both of its laterally opposite sides by such a tongue-and-groove coupling to the frame 15 prevents relative lateral movement between them which would permit them to separate at either such coupling.

As indicated earlier, it is assumed that boards 20a and 20b (FIG. 1) have been fitted into frame 15 prior to the coupling of board 20c thereto set as described above, and it is further assumed that boards 20a and 20b have been displaced leftward (FIG. 1) within that frame as far as these boards will go. Once board 20c has been initially coupled with frame 15 as depicted in FIG. 3, it is shifted leftward within the frame (remaining coupled thereto by virtue of its tongue-and-groove couplings therewith) until the board 20c contacts board 20b. When the several boards 20 received in frame 15 are in contact with each other, these boards are also coupled with each other as will now be described.

Referring to FIG. 9, when the board 20c is shifted leftward relative to frame 15 to come into contact with the board 20b already positioned leftward in the frame as far as board 20b will go, the single longitudinally projecting flange 115b on the right side (FIG. 9) of board 20 first approaches and then enters into the groove 102c defined between the vertically spaced longitudinally projecting flanges 100c and 101c on the left hand side of board 20c. Thus, when the boards 20b, 20c are in contact with each other, they are coupled together by the tongue-and-groove coupling provided by the flange elements 115b, 100c, and 101c.

From what has been said, it will be evident that when all of boards 20a–20f (FIG. 1) have been fitted in tongue-and-groove coupled relation into frame 15 and have been shifted therein as far left as possible, each of such boards will also have a tongue-and-groove coupling with the board or boards adjacent thereto. Moreover, the left hand side (FIG. 1) of board 20a will have a tongue-and-groove coupling with the left hand tie member 50d by virtue of the lip 67d (FIG. 5) of that member being inserted in the groove defined at the left side of board 20a between the vertically spaced upper and lower stub flanges provided on that side by, respectively, the longitudinally projecting groups of tabs 103a–106a and of tabs 107a–110a.

An advantage of having each board 20 in frame 15 tongue-and-groove coupled on one of its longitudinally opposite sides to another board or to the frame is that such board is thereby supported on such side to resist a vertical load imposed on the board as, say, when one of the caps of the terminals on that board is pressed down in order to connect a lead threaded through that cap to the terminal strip in such terminal. That is, a useful effect of a tongue-and-groove coupling of a board at one or both of its longitudinally spaced sides (and, also, at one or both of its laterally spaced sides) is to distribute such a load initially imposed on the board to support means therefor adjacent the board such that the board is better suited to resist the load.

The loading of the boards 20 into frame 15 is complete when tabs on the board 20f are (in the manner already described for board 20c) passed through the gaps 41a1–41a5 and 41b1–41b5 (FIG. 4) on the frame 15, and the board 20f is then slid to the left (FIG. 1) to contact board 20e. After such contact is made, keeper bar 46 is fastened to the top of frame 15 (FIG. 1) by passing the self-tapping screws 45 through the holes therefor in the bar and then into the holes 44a, 45b (FIG. 4) in the rails 30a, 30b to be held in such holes by the threads formed therein by the self-tapping action of such screws. The keeper 46 when so fastened to frame 15 prevents the boards 20 received in the frame from shifting rightward far enough to permit a registration between tabs and gaps on the board and frame which would permit one or more boards to become inadvertently decoupled from the frame. Such a decoupling can of course, if desired, be deliberately realized by detaching the bar 46 from the frame and then appropriately manipulating the board or boards to be removed in relation to the frame.

With keeper bar 46 being fastened to frame 15, the terminal board panel is completely assembled. Ordinarily, thereafter, the interconnections of the terminal boards of the panel with conductors and leads brought thereto is undertaken with the panel remaining detached from a housing. After such wiring work has been completed, the panel is mounted within a housing therefor (not shown) with the axis 35c of the panel being vertical. The mounting is effected by passing screws (not shown) through the apertures 54c–56c and 54d–56d (FIG. 4) in the ends of frame 15 and then into holes in such housing to be threadedly received in such holes. If desired, at least part of the interconnection work may be done with the panel being fastened as described within its housing.

The frame 15 has been described so far as having on each of its rails 30a, 30b an upper flange comprising an alternation of tabs and gaps. If desired, however, one of such tab-and-gap flanges may be replaced by a flange in the form of a simple continuous web in the length of the rail of which such flange is a part. When, say, the rear rail 30a (FIG. 4) has such a continuous web upper flange thereon, the boards 20 may be fitted into frame 15 in the same way as previously described for board 20c in connection with FIGS. 9 and 10 with only the following changes being made in the fitting procedure. First, the board is initially positioned over the frame such that the flanges on the rear side of the board are slightly in front of the front edge of the upper continuous web flange of rail 30. Second, the board is angularly tilted slightly about its longitudinal axis (kept stationary) to produce registration in the vertical direction between the upper continuous web flange on rail 30a and the groove between the upper and lower flanges on the rear side of the board. Third, the board is translaterally displaced rearward to cause such web flange to enter such groove. Fourth, the operations already described in connection with FIGS. 10 and 3 are carried out by lowering (FIG. 10) only the front side of the board until the angular tilt thereof is reduced to zero (rather than, as earlier described, lowering both the front and rear sides of the board while maintaining the board horizontal from start to finish,) and by then sliding the board leftward (FIG. 3) to lock the "tongue" constituted of rail flange 32b into the "groove" between the upper and lower flanges 70 and 71 on the front of the board. When such angular tilting technique is used to fit the board with the frame, not only may the upper flange of one of the rails 30a, 30b be a continuous web flange, but, also, one or both of the upper and lower board flanges which cooperate with that rail flange may be a continuous web flange whether such rail flange has a longitudinally continuous structure or a tab-and-gap structure. What has just been said is true because no tab and gaps are needed to realize a tongue-and-groove coupling between one of the rails 30 and the adjacent side of a board 20 when the coupling is effected by the angular tilting and lateral motions of the board which have just been described.

Another matter worth noting is that while, as earlier mentioned, the upper flanges 32 of the rails 30 serve as tongues for tongue-and-groove couplings of which the grooves are the grooves 72 between the upper and lower flanges 70 and 71 on the boards 20, it is also true that the lower flanges 71 on the boards are inserted as tongues in the grooves between the upper and lower flanges 32, 33 on the rails. Thus, although such tongues fit loosely in such grooves, it can properly be said that the boards 20 are joined to each of the rails 30 by a double tongue-and-groove coupling.

The above described embodiment being exemplary only, it will be appreciated that additions thereto, omissions therefrom and modifications thereof can be made without departing from the spirit of the invention and that, accordingly, the invention is not to be considered as limited save as is consonant with the recitals of the following claims.

I claim:

1. A terminal board panel comprising: frame means enclosing a rectangular space and comprising, a pair of longitudinal rail means on laterally opposite sides of said space and a pair of tie means at longitudinally opposite ends of said space and each laterally extending between such two rail means to join them together, a plurality of terminal boards fitted end-to-end in said space to form therein a longitudinal column of such boards, inner flange means disposed in the length of each rail means on its inside to project inwards towards the other rail means, and a pair of outer flange means disposed on each terminal board on its laterally opposite sides to each project outward from one such side so as to laterally overlap with the inner flange means of the rail means on that side, the pairs of outer flange means on said boards being each cooperable with the inner flange means overlapping therewith of said two rail means to provide for each of said boards two longitudinally extending tongue and groove couplings which each has an inner flange means and an outer flange means respective thereto, and by which such board is coupled on each of its laterally opposite sides to one of said two rail means to thereby be held in said space by said frame means, each of the inner and outer flange means of at least one of such two couplings for at least one of said terminal boards being a double flange means comprising first and second means transversely spaced from each other to provide therebetween the groove for such tongue and groove coupling, and projecting outward from the bottom of such groove to constitute respective flanges in relation to such bottom, and each of the inner and outer flange means of at least one of such two couplings for at least one of said terminal boards comprising an alternation along the longitudinal extent of such flange means of projecting tabs and of gaps between such tabs, the alternations of such two flange means being respectively configured to permit the tabs of each by transverse movement relative to the other, to pass through the gaps of the other, when such board is in a first longitudinal phase position relative to said frame means, to thereby effect by such transverse movement the insertion of a tongue for such coupling into a groove thereof, and the alternations of such two flange means being further respectively configured to produce at least part registration between the tabs of the one and the tabs of the other, when said board is subsequently shifted from said first position to a second longitudinal phase position relative to said board, so as by such registration to prevent subsequently such a transverse movement of said two flange means, and so as to thereby subsequently maintain such tongue of such coupling in such groove thereof.

2. A panel according to claim 1 further comprising keeper means incorporated in said panel and adapted to selectably prevent such board when in said second phase position from reverting to said first phase position.

3. A panel according to claim 1 in which both the inner flange means and the outer flange means of such a coupling is a double flange means comprising first and second flange means transversely spaced from each other to provide therein a groove for such coupling, and in which part of each of such inner flange means and such outer flange means is inserted as a tongue into the groove so provided by the other so as to render such coupling a double tongue-and-groove coupling.

4. A panel according to claim 1 in which each of said boards at each of its longitudinally opposite ends has coupling means adapted to provide at that end a coupling of such board with another board adjacent such end or a tie means adjacent thereto.

5. A frame for holding a plurality of terminal boards comprising, a pair of longitudinally extending rail means disposed opposite each other on laterally opposite sides of a rectangular space for receiving said boards end-to-end in a longitudinal column thereof in said space, and a pair of coupling means on one and the other, respectively, of such two rail means, each such coupling means being disposed along the length of the rail means respective thereto on the inside thereof and being adapted to cooperate with means adjacent such rail means on a terminal board disposed in said space adjacent said rail means to provide a holding coupling between such board and such rail means, said coupling means on at least a first of such two rail means comprising longitudinally extending flange means projecting from such first rail means laterally inwards towards the second rail means, said flange means comprising first and second transversely spaced web flanges extending longitudinally along such first rail means, and at least one of said web flanges comprising an alternation along the longitudinal extent of said flange means of laterally inwardly projecting tabs and of gaps between such tabs.

6. A frame according to claim 5 in which each such rail means in said pair thereof comprises a "U" channel rail having a central web and two separated webs joined by said central web, said central web being disposed laterally on the outside of such rail away from said rectangular space in said frame, said separated webs providing first and second web flanges projecting laterally inwards towards the central region of said space.

* * * * *